United States Patent
Acar et al.

(10) Patent No.: US 11,990,664 B2
(45) Date of Patent: May 21, 2024

(54) TRANSMISSION LINE COMPRISING A LAYERED STACKED INCLUDING METAL AND DIELECTRIC LAYERS DEFINING A STRIPLINE WHICH IS CONFIGURED TO MEANDER IN PERPENDICULAR MEANDERING PLANES

(71) Applicant: NXP B.V., Eindhoven (NL)

(72) Inventors: Mustafa Acar, Eindhoven (NL); Philipp Franz Freidl, Weurt (NL); Dominicus Martinus Wilhelmus Leenaerts, Riethoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/809,978

(22) Filed: Jun. 30, 2022

(65) Prior Publication Data

US 2023/0008852 A1    Jan. 12, 2023

(30) Foreign Application Priority Data

Jul. 8, 2021    (EP) .................................... 21184453

(51) Int. Cl.
| | |
|---|---|
| *H01P 9/00* | (2006.01) |
| *G01S 13/88* | (2006.01) |
| *H01P 1/24* | (2006.01) |
| *H01P 3/08* | (2006.01) |
| *H01Q 21/06* | (2006.01) |

(52) U.S. Cl.
CPC .............. *H01P 9/006* (2013.01); *G01S 13/88* (2013.01); *H01P 1/24* (2013.01); *H01P 3/081* (2013.01); *H01P 3/088* (2013.01); *H01Q 21/065* (2013.01)

(58) Field of Classification Search
CPC ........................................................ H01P 9/006
USPC ........................................................ 333/246
See application file for complete search history.

(56) References Cited

U.S. PATENT DOCUMENTS

| | | | | |
|---|---|---|---|---|
| 3,899,757 A | * | 8/1975 | Nakagami et al. | H01P 9/006 333/156 |
| 4,570,136 A | * | 2/1986 | Kameya | H01P 9/006 333/140 |
| 6,313,716 B1 | * | 11/2001 | Apostolos | H01P 9/006 333/164 |
| 2013/0063297 A1 | | 3/2013 | Papziner et al. | |
| 2017/0256835 A1 | | 9/2017 | Mei | |
| 2019/0280360 A1 | | 9/2019 | Seebacher et al. | |

OTHER PUBLICATIONS

Arigong, B., "An ultra-slow-wave transmission line on CMOS technology", Microwave and Optical Technology Letters, vol. 59, No. 3, Mar. 2017.

Huray, P., "Impact of Copper Surface Texture on Loss: A Model that Works", DesignCon, Feb. 1-4, 2010.

Jiang, H., "X-Band 3D Meander Stripline Delay Line using Multilayer LTCC", 2009 IEEE MTT-S International Microwave Symposium Digest, Jun. 7-12, 2009.

(Continued)

*Primary Examiner* — Benny T Lee (57) ABSTRACT

A transmission line. The transmission line includes a reference electrode. The transmission line also includes a stripline. The stripline meanders within a plane. The stripline has a non-planar profile when viewed along a direction parallel to the plane.

20 Claims, 5 Drawing Sheets

(56) References Cited

OTHER PUBLICATIONS

Maloratsky, L., "Using Modified Microstrip Lines to Improve Circuit Performance", High Frequency Electronics, Summit Technical Media, LLC, Mar. 2011.

Vinothkumar, M., "Review of Planar Slow Wave Structures for Travelling Wave Tube", International Journal of Pure and Applied Mathematics, vol. 119 No. 10 2108, 273-277, Jan. 2018.

Yu, G., "Analysis of the coaxial helical-groove slow-wave structure", IEEE Transactions on Microwave Theory and Techniques, vol. 50, Issue 1, Aug. 7, 2002.

\* cited by examiner

TRANSMISSION LINE COMPRISING A LAYERED STACKED INCLUDING METAL AND DIELECTRIC LAYERS DEFINING A STRIPLINE WHICH IS CONFIGURED TO MEANDER IN PERPENDICULAR MEANDERING PLANES

CROSS-REFERENCE TO RELATED APPLICATIONS

This application claims the priority under 35 U.S.C. § 119 of European Patent application no. 21184453.5, filed on Jul. 8, 2021, the contents of which are incorporated by reference herein.

BACKGROUND

The present specification relates to a transmission line, e.g., for an antenna.

Many Radio Frequency (RF) applications require good terminations (load). With increasing frequencies, the utilization of discrete components (e.g. Surface Mounted Device (SMD) resistors) becomes more and more challenging due to space constraints and parasitics associated with the discrete components.

One way to achieve these terminations without the use of discrete components is a long open ended matched transmission line. The losses of transmission line define the performance of the termination.

SUMMARY OF THE INVENTION

Aspects of the present disclosure are set out below.

According to an aspect of the present disclosure, there is provided a transmission line comprising:
 a reference electrode; and
 a stripline meandering within a plane and having a non-planar profile when viewed along a direction parallel to the plane.

The stripline may have a first surface that is substantially perpendicular to a first surface normal to the plane. The first surface may have a non-planar profile when viewed along a direction parallel to the plane.

The stripline may have a second surface that is substantially parallel to a second surface normal to the plane. The first and second surface normals to the plane may be substantially antiparallel. The second surface may have a non-planar profile when viewed along a direction parallel to the plane.

The transmission line may include a plurality of rectangular cuboids. The plurality of rectangular cuboids may define a meander pattern of the stripline.

The plurality of rectangular cuboids may include first rectangular cuboids having a first dimension along a direction perpendicular to the plane. The plurality of rectangular cuboids may include second rectangular cuboids having a second dimension along the direction perpendicular to the plane. The first dimension may be different relative to the second dimension.

The transmission line may include a plurality of layers. The plurality of rectangular cuboids may include rectangular cuboids contained within one layer of the plurality of layers. The plurality of rectangular cuboids may include rectangular cuboids contained within another layer of the plurality of layers. The plurality of rectangular cuboids may include cuboids which span at least two layers of the plurality of layers.

The rectangular cuboids may have a layout, when viewed along a direction perpendicular to the plane, which defines a meander pattern of the stripline.

A meander pattern of the strip line may include a first meander having a first period and a second meander having a second period. The second period may be different relative to the first period.

The transmission line may further include a second reference electrode. The stripline may be located between the reference electrode and the second reference electrode.

The transmission line may be a microstrip transmission line.

The stripline and the or each reference electrode may be defined by patterned electrically conductive features in a layered stack. The stack may, for instance, be a metallization stack.

The or each reference electrode may be substantially planar.

According to another aspect of the present disclosure, there is provided an antenna comprising a transmission line of the kind set out above, for termination of the antenna.

According to a further aspect of the present disclosure, there is provided a phased array system or RADAR mmW antenna array comprising a plurality of antennae of the kind set out above. A phased array system of the kind described herein may, for instance, be used in a 5G or 6G mmWave phased array communication system, although other applications are also envisaged.

BRIEF DESCRIPTION OF THE DRAWINGS

Embodiments of this disclosure will be described hereinafter, by way of example only, with reference to the accompanying drawings in which like reference signs relate to like elements throughout the detailed description and drawings, and in which.

DETAILED DESCRIPTION OF THE INVENTION

Embodiments of this disclosure are described in the following with reference to the accompanying drawings.

Figure 1:
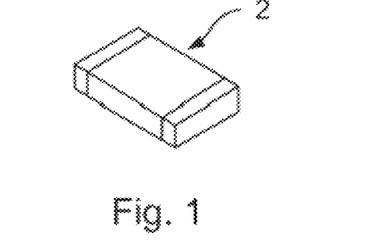
FIG. 1 shows a SMD discrete resistor.

FIG. 1 shows a Surface Mounted Device (SMD) discrete resistor 2. Resistors of the kind shown in FIG. 1 may be used to provide terminations for the antennae of a phased array antenna. Typically, a resistor 2 of the kind shown in FIG. 1 may have a footprint with dimensions of around 1 mm×0.5 mm. A typical resistance value for a resistor 2 used for terminations is around 50Ω (e.g. in a 100 GHz phased array).

Figure 2:
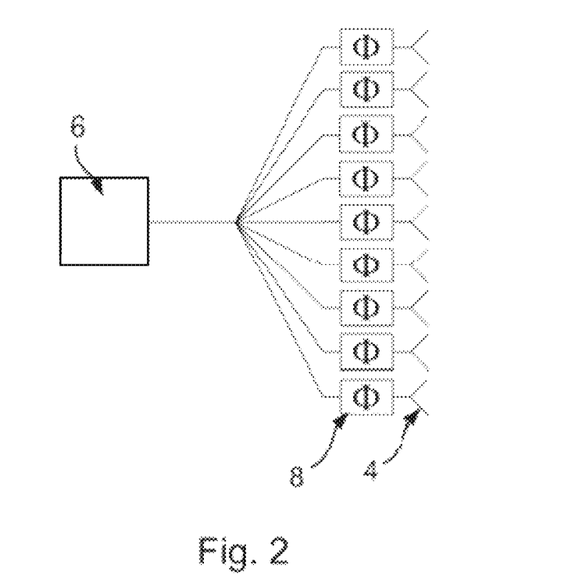
FIG. 2 shows a phased array including a plurality of antennae.

FIG. 2 shows a phased array antenna. The phased array antenna includes an array of antennae 4. The array is a linear array in this example, although 2D arrays are also envisaged. In some embodiments, the antennae 4 may be patch antennae. The phased array antenna also includes a transmit source 6 for supplying transmit signals to the antennae 4 via a plurality of respective phase shifters 8 having phase shift amounts (Φ).

The dimensions of the devices used for termination of the antennae 4 shown in FIG. 2 may place restraints upon the dimensions antennae 4. This may be particularly problematic for large arrays, and/or where discrete resistors of the kind shown in FIG. 1 are used.

Figure 3:
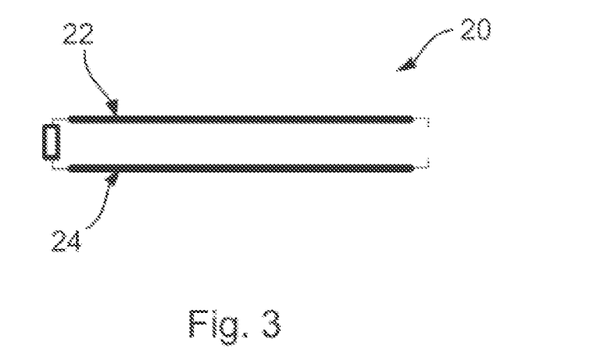
FIG. 3 shows a transmission line.

One way to achieve the terminations in a phased array of the kind shown in FIG. 2, without the use of resistors of the kind shown in FIG. 1, is to use a long open ended matched transmission line. FIG. 3 shows an example of such a transmission line 20. Schematically, the transmission line 20 includes a first pole 22 and a second pole 24. The first and second poles 22, 24 may be elongate and may coextend. The first and second poles may be coupled at one end to an antenna 4 (e.g., one of antennas 4, FIG. 2). The losses of transmission line 20 define the performance of the termination. However, the dimensions of such a transmission line 20 may place similar constraints upon the dimensions and layout of the antennae 4 (FIG. 2) (and consequently also the phased array) to those described above in relation to the discrete resistor 2 (FIG. 1).

Embodiments of this disclosure may provide a transmission line that has higher losses than a conventional transmission line, and which may occupy less space than a conventional transmission line. These factors may allow for greater flexibility in the dimensions and layout of a phased array including antennae 4 of the kind described above.

Figure 4A:
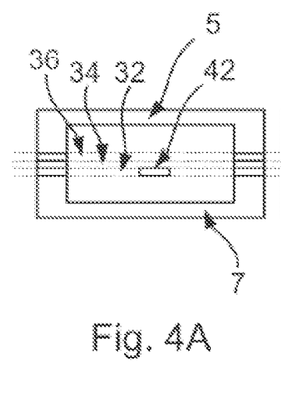
FIG. 4A shows a cross section of a portion of a transmission line according to an embodiment of this disclosure.
Figure 4B:
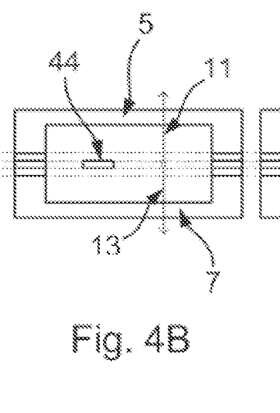
FIG. 4B shows a cross section of a portion of a transmission line according to an embodiment of this disclosure.
Figure 4C:
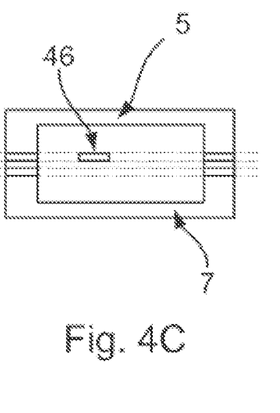
FIG. 4C shows a cross section of a portion of a transmission line according to an embodiment of this disclosure.

FIGS. 4A, 4B, and 4C show cross sections at three different positions along the length of a transmission line according to an embodiment of this disclosure.

The transmission line includes a reference electrode 7 and a stripline that includes stripline sections 42, 44, 46 (FIGS. 4A, 4B, and 4C, respectively). As will be described below in relation to, for example, FIG. 5C, the stripline meanders within a plane. In this example, the transmission line is a stripline type transmission line, which includes a second reference electrode 5 (FIG. 5C). However, it is envisaged that the second reference electrode 5 may be omitted (e.g. the transmission line may be a microstrip transmission line). reference electrode 5, 7 (FIG. 5C) may be substantially planar, and may extend substantially parallel to the meander plane of the stripline. The stripline sections 42, 44, 46 may be located in-between the reference electrodes 5, 7. The stripline sections 42, 44, 46 and the reference electrode(s) 5, 7 are electrically conductive (e.g. metallic (e.g. copper), or e.g. polysilicon).

A transmission line according to embodiments of this disclosure may, for instance, be implemented by patterned electrically conductive features in a layered stack. In some embodiments, the stack may be a metallization stack. The electrically conductive features may, for instance, be metallic (e.g. copper), or may comprise another electrically conductive material, such as polysilicon. The stack may comprise a plurality of (e.g. metal) layers. The stack may also include dielectric (which may also be provided in layers), which surrounds the electrically features of the stack. The electrically conductive features of the stack may be patterned (e.g. using damascene processing), to define the features of the stripline (including stripline sections 42, 44, 46) and the reference electrode(s) 5, 7 in each layer.

A transmission line according to embodiments of this disclosure may be provided on the surface of a substrate, such as a printed circuit board (PCB) or may be provided within a package containing other features (e.g. a semiconductor die including circuitry for operating the phased antenna array).

In accordance with embodiments of this disclosure, the stripline has a non-planar profile when viewed along a direction parallel to the meander plane of the stripline. This may, for instance, be implemented by patterning the electrically conductive layers of a stack (e.g. metallization stack) of the kind described above. In the embodiment shown in FIGS. 4A, 4B, and 4C, the stripline occupies three layers or levels 32, 34, 36, as shown in FIG. 4A. Where the transmission line is implemented in a metallization stack, these layers/levels 32, 34, 36 may correspond to metal levels in the metallization stack.

The non-planar profile of the stripline in the present embodiment is implemented by placing different sections 42, 44, 46 of the stripline in different levels, along the length of the stripline. In the present embodiment, for instance, stripline section 42 is located in layer/level 32, as shown in FIG. 4A, stripline section 44 (FIG. 4B) is located in layer/level 34 (FIG. 4A), and stripline section 46 (FIG. 4C) is located in layer/level 36 (FIG. 4A). This results in the stripline being located at a different height within the transmission line, as a function of distance along the stripline. In some embodiments, this may result in the stripline having a 'vertical' meander pattern. Note that in FIGS. 4A, 4B and 4C, the lateral positions of the stripline sections 42, 44, 46 alters along the length of the stripline, according to the meander pattern.

This variation in the height of the stripline in turns results in the stripline having a non-planar profile when viewed along a direction parallel to the meander plane of the stripline. As noted above, in some embodiments, the resulting stripline may have a meander pattern in a direction perpendicular to the meander plane noted above. The stripline thereby acquires a roughness, which can increase the losses (and hence provides resistance) of the stripline relative to a stripline that extends within a single level (i.e. which has a planer profile when viewed along a direction parallel to the meander plane of the stripline.

In the embodiment shown in FIGS. 4A, 4B, and 4C, the stripline has a first surface, which has a surface normal substantially parallel is substantially perpendicular to a first surface normal 11 (FIG. 4B) to the meander plane, and a second surface, which is substantially perpendicular to a second surface normal 13 (FIG. 4B) to the meander plane (the surface normals 11, 13 to the meander plane are marked in FIG. 4B).

In some embodiments, the stripline may only have a roughness at the first surface, while the second surface may be substantially planar. For instance, the stripline may primarily occupy layer/level 34 (FIG. 4A), but may occasionally extend into layer/level 36 as shown in FIG. 4B. It is envisaged that this arrangement may, be reversed, such that the stripline primarily occupies layer/level 34 as shown in FIG. 4B, but occasionally extends into layer/level 32 (FIG. 4A).

In the embodiment shown in FIG. 4B, however, both the first surface and the second surface of the stripline exhibit a degree of roughness (both surfaces have a non-planar profile when viewed along a direction parallel to the meander plane), implemented by the extension of the stripline into both the layers/levels 32, 36. This may further increase the losses of the transmission line, compared to transmission lines having a stripline which has only a single non-planar surface.

In some embodiments, the stripline may comprise a plurality of rectangular cuboids defining a meander pattern of the stripline. Each rectangular cuboid may adjoin and be in electrical communication with one or more neighbouring rectangular cuboids in the stripline. In the embodiment shown in FIGS. 4A, 4B, and 4C, these cuboids may correspond to the stripline sections 42, 44, 46. The rectangular cuboids may, for instance, each comprise a square cuboid or a cube. Each rectangular cuboid making up the stripline may be formed by a patterned electrically conductive features of a stack (e.g. metallization stack) of the kind described above. Further details of the way in which the rectangular cuboids define the meander pattern will be provided below in relation to, for example, FIG. 5C.

Figure 5A:
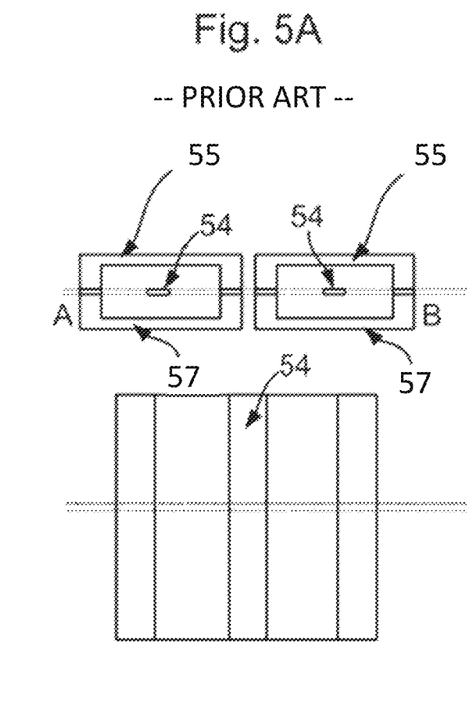
FIG. 5A shows a conventional transmission line.
Figure 5B:
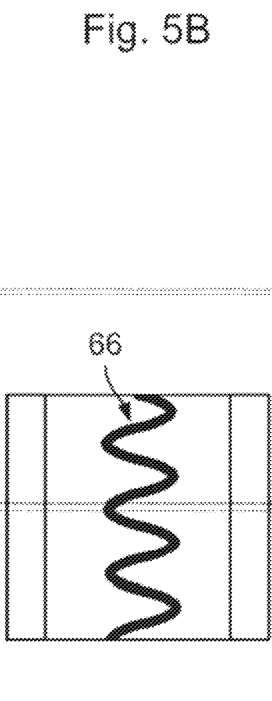
FIG. 5B schematically shows a meander pattern.
Figure 5C:
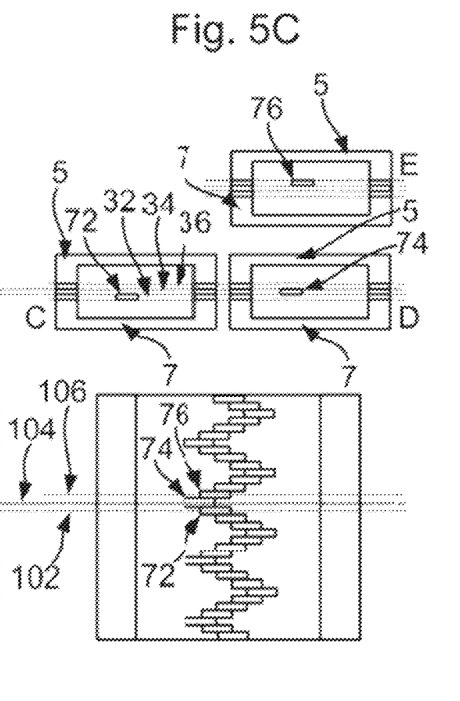
FIG. 5C shows how a meander pattern may be implemented in a transmission line according to embodiments of this disclosure.

FIG. 5A shows a conventional transmission line. FIG. 5B schematically shows a meander pattern 66 (FIG. 5B). FIG. 5C shows how a meander pattern 66 may be implemented in a transmission line according to embodiments of this disclosure. Each of FIGS. 5A, 5B and 5C shows a view along a surface normal of one of the surfaces of the stripline (e.g. so the meander pattern of the stripline in FIG. 5C is visible). In FIG. 5A, the cross section A corresponds to position 102 along the stripline and the cross section B corresponds to position 104 along the stripline. In FIG. 5C, the cross section C corresponds to position 102 along the stripline, the cross section D corresponds to position 104 along the stripline, and the cross section E corresponds to position 106 along the stripline.

The conventional transmission line shown in FIG. 5A has reference electrodes 55, 57 and a stripline 54. Note that the stripline 54 is substantially linear (does not have a meander pattern) and extends within a single layer/level.

The meander pattern 66 shown in FIG. 5B may allow a stripline to be more compact, thereby to occupy less space (smaller footprint).

In FIG. 5C, the meander pattern of the stripline substantially matches the meander pattern 66 shown in FIG. 5B. As can be seen in FIG. 5C, successive rectangular cuboids (e.g. rectangular cuboids 72, 74, 76) may be (laterally) offset with respect to neighbouring rectangular cuboids along the length of the stripline, so as to define the meander pattern. The thickness and dimensions of the rectangular cuboids and the amount of offset between neighbouring rectangular cuboids may be selected so as to define the period and amplitude of the meander pattern, as well as the overall shape of the meander pattern (e.g. sinusoidal, rectangular wave, square wave, saw tooth etc.). The meander pattern shown in the embodiment of FIG. 5C is substantially sinusoidal.

In addition to the meander pattern, the stripline shown in FIG. 5C also has a non-planar profile when viewed along a direction parallel to the meander plane. As may be seen in the cross sections shown in FIG. 5C, the stripline occupies a different layer/level (e.g. layers/levels 32, 34, 36, as shown in FIG. 5A) according to the position (e.g. positions 102, 104, 106) along the stripline. For instance, in this embodiment, rectangular cuboid 72, at position 102, occupies layer/level 32, rectangular cuboid 74, at position 104, occupies layer/level 34, and rectangular cuboid 76, at position 106, occupies layer/level 36. The arrangement of the rectangular cuboids in the present embodiment is therefore analogous to the arrangement described above in relation to FIGS. 4A, 4B, and 4C. As noted above, in some embodiments, the vertical offsets of the rectangular cuboids of the stripline may result in the stripline having a meander pattern in a direction perpendicular to the meander plane.

Figure 6:
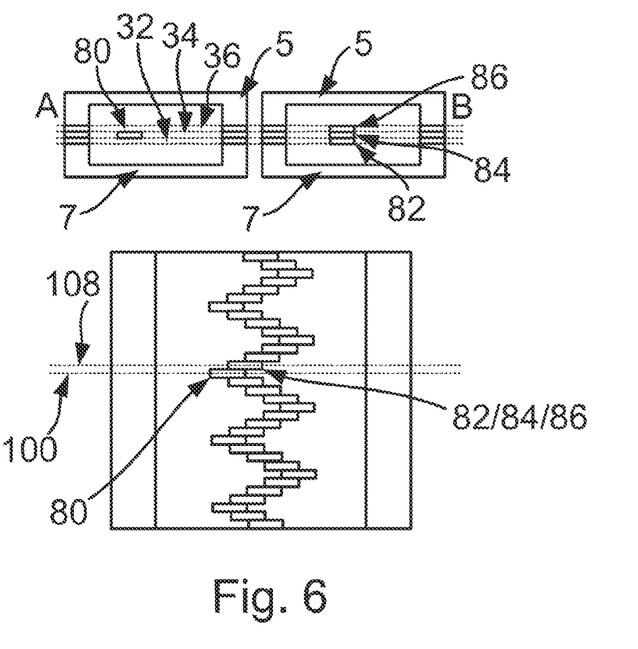
FIG. 6 shows a transmission line according to an embodiment of this disclosure.

FIG. 6 shows a transmission line according to a further embodiment of this disclosure. The meander pattern of the stripline in this embodiment is analogous to the meander pattern described above in relation to FIG. 5C.

In FIGS. 4A, 4B, 4C, and 5C, the arrangement of the rectangular cuboids is such that, at each successive position along the stripline, there is a single rectangular cuboid, which is located at a certain height within the structure, where each successive rectangular cuboid is either higher or lower than its (nearest) neighbouring rectangular cuboids. However, other arrangements are envisaged. FIG. 6 shows one such alternative arrangement.

In the embodiment of FIG. 6, cross section A corresponds to the position 100 along the stripline, while cross section B corresponds to the position 108 along the stripline. At position 100, a single rectangular cuboid 80 is provided in layer/level 34. However, at position 108, three rectangular cuboids 82, 84, 86 are provided in layers/levels 32, 34, 36, respectively. While the rectangular cuboids 82, 84, 86 in FIG. 6 are shown as separately for purposes of illustration, these rectangular cuboids 82, 84, 86 may also be considered to be a single rectangular cuboid, having a different thickness to the rectangular cuboid 80 and spanning multiple layers.

Thus, the overall thickness of the stripline at position 108 is greater than the thickness of the stripline at position 100. This arrangement may, for instance, alternate along the length of the stripline (e.g. in a 1/3/1/3/1 . . . pattern, where each value represents the thickness at a given successive position along the stripline).

A number of further variations of the structure shown in FIG. 6 are envisaged. For instance, the number of rectangular cuboids (or to put it another way, the thickness of the overall rectangular cuboid) located at any given position along the stripline may be greater (or fewer) than illustrated in FIG. 6. By way of example, using the notation established above, the arrangement may alternate with an n/N/n/N/n/N . . . pattern, where n denotes thinner parts of the stripline and N denotes thicker parts of the stripline. In particular, it is envisaged that n≥1; N>2 and N>n.

Further variations along the length of the stripline are envisaged. For instance, at some (nearest) neighbouring positions along the stripline, the stripline may have the same thickness as at a preceding or following position (by way of example only, n/n/N/n/n/N/n/n/N . . . ; N/N/n/N/N/n/N/N/n . . . ; n/n/N/N/n/n/N/N/n/n/N/N . . . ). Furthermore, while FIG. 6 only has two thickness values for the stripline, it is envisaged that more than two thickness values may appear along the length of the stripline (e.g. n, N, M, O . . . where n, N, M, O . . . are unique values and N, M, O . . . are all greater than n).

In still a further variation, while all of the sequences described above in relation to FIGS. 4A, 4B, 4C, 5B, 5C, and 6 have periodically varying arrangements, it is also envisaged that a substantially random or pseudo random sequence could be used (e.g. 2/3/4/1/3/2/1/4 . . . ). In yet a further variation, the thickness of the stripline may remain substantially constant along the length thereof (e.g. as per FIGS. 4A, 4B, 4C, and 5C), but the vertical position of the stripline within the transmission line structure may vary substantially randomly or pseudo randomly along its length.

In still a further variation, and as noted above, in some embodiments, the vertical offsets of the rectangular cuboids of the stripline may result in the stripline having a meander pattern in a direction perpendicular to the meander plane.

Figure 7:
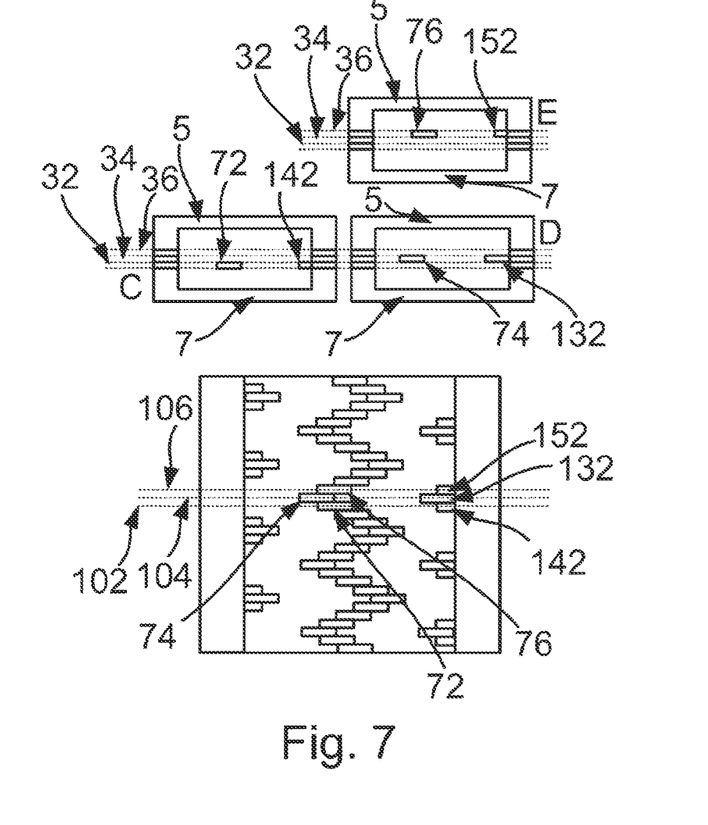
FIG. 7 shows a transmission line according to an embodiment of this disclosure.

FIG. 7 shows a transmission line according to another embodiment of this disclosure. The transmission line in this embodiment is similar to the transmission line shown in FIG. 5C and only the differences will be described here in detail.

In this embodiment, further conductive features 132, 142, 152 are provided laterally with respect to the stripline (i.e. generally within the meander plane). These further conductive features 132, 142, 152 may be provided in the form of rectangular cuboids of the kind described above with respect to FIG. 6. As can be seen in the cross sections C, D, E in FIG. 7, the further conductive features 132, 142, 152 may be located in the same respective layers or levels 32, 34, 36 as the rectangular cuboids 72, 74, 76 to which they are adjacent in the stripline. For instance, in FIG. 7, conductive feature 142 is located in layer/level 32 along with rectangular cuboid 72, conductive feature 132 is located in layer/level 34 along with rectangular cuboid 74, and conductive feature 152 is located in layer/level 36 along with rectangular cuboid 76.

It is envisaged that further conductive features of the kind shown in FIG. 7 may also be used in embodiments of the kind shown in any of FIG. 4C or 6. The vertical thickness of the further conductive features may be varied along the length of the stripline, in much the same way as described above in respect of the rectangular cuboids in FIG. 6.

The further conductive features 132, 142, 152 can act to maintain a substantially constant distance between the stripline and the lateral edges of the transmission line, along the length of the stripline. This can keep the impedance of the stripline substantially constant along its length, thereby providing a more balanced and better matched stripline.

Figure 8:
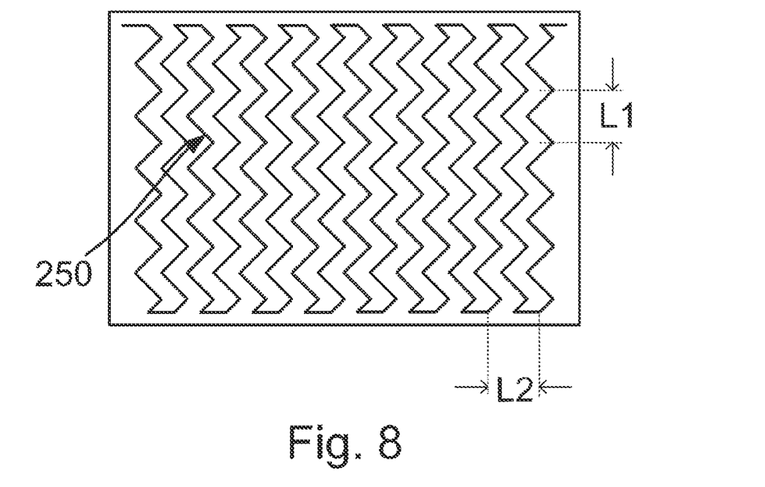
FIG. 8 shows a transmission line according to an embodiment of this disclosure.

FIG. 8 shows a transmission line according to a further embodiment of this disclosure. In this embodiment, the stripline 250 has a meander pattern which includes a first meander having a first period L1 and a second meander having a second period L2. The second period L2 may be different to the first period L1. For instance, L2 may be greater than or smaller than L1. Alternatively, or in addition, the (propagation) wave vector corresponding to the period L2 may be non-parallel to the (propagation) wave vector corresponding to the period L1 (e.g. in the example of FIG. 8, the (propagation) wave vectors of L1 and L2 are orthogonal to each other). Arrangements of the kind shown in FIG. 8 can further assist in reducing the footprint dimensions of a transmission line (since a relatively long stripline may be accommodated within a relatively small area, which may correspond approximately in size and shape to the footprint of an antenna). By way of example, it is envisaged that a 10 mm stripline having the configuration shown in FIG. 8 may be accommodated within an area of around 0.5 mm×1.0 mm.

A transmission line according to embodiments of this disclosure can achieve greater losses per unit size. This can allow termination to be achieved with a smaller sized device, for a given termination resistance. Embodiments of this disclosure may thus allow terminations within, for example, the antennae of an array of antennae to be implemented in a manner that places fewer restrictions on the dimensions and layout of the array.

In some embodiments, there may be provided a phased array system (e.g. of the kind shown in FIG. 2) including a plurality of so-terminated antennae. It is also envisaged that so-terminated antennae may be provided in a RADAR mmW antenna array. In these embodiments, one transmission line may be provided for terminating each respective antenna in the array.

Accordingly, there has been described a transmission line. The transmission line includes a reference electrode. The transmission line also includes a stripline. The stripline meanders within a plane. The stripline has a non-planar profile when viewed along a direction parallel to the plane.

Although particular embodiments of this disclosure have been described, it will be appreciated that many modifications/additions and/or substitutions may be made within the scope of the claims.

The invention claimed is:

1. A transmission line comprising:
   a layered stack that includes a plurality of metal layers and dielectric layers;
   a reference electrode formed from a portion of a first metal layer of the layered stack; and
   a stripline meandering along a meander pattern within a meander plane and having a surface that also meanders in a direction perpendicular to the meander plane, wherein the stripline includes a first stripline section that includes a first patterned conductive feature in a form of a first rectangular cuboid within a second metal layer of the layered stack, and a second stripline section that includes a second patterned conductive feature in a form of a second rectangular cuboid within a third metal layer of the layered stack, wherein the first and second rectangular cuboids are directly connected together.

2. The transmission line of claim 1, wherein the meander pattern of the stripline includes a first meander having a first period and a second meander having a second period, wherein the second period is different relative to the first period.

3. The transmission line of claim 1, further comprising:
   a third stripline section that includes a third patterned conductive feature in a form of a third rectangular cuboid within a fourth metal layer of the layered stack, wherein the second and third rectangular cuboids are directly connected together.

4. The transmission line of claim 1, further comprising: a plurality of additional rectangular cuboids, wherein the first and second rectangular cuboids and the plurality of additional rectangular cuboids define the meander pattern of the stripline.

5. The transmission line of claim 4, wherein the meander pattern of the stripline includes a first meander having a first period and a second meander having a second period, wherein the second period is different relative to the first period.

6. The transmission line of claim 4, wherein the first and second rectangular cuboids and the plurality of additional rectangular cuboids includes:
   a first set of rectangular cuboids contained within one layer of said plurality of metal layers; and
   a second set of rectangular cuboids contained within another layer of said plurality of metal layers.

7. The transmission line of claim 6, wherein the first and second rectangular cuboids and the plurality of additional rectangular cuboids includes cuboids which span at least two layers of the plurality of metal layers.

8. The transmission line of claim 4, wherein the first and second rectangular cuboids and the plurality of additional rectangular cuboids have a layout, which defines the meander pattern of the stripline.

9. The transmission line of claim 4, further comprising a second reference electrode, wherein the stripline is located between the reference electrode and the second reference electrode.

10. The transmission line of claim 4, wherein the reference electrode is substantially planar.

11. The transmission line of claim 1, wherein the transmission line is a microstrip transmission line.

12. The transmission line of claim 1, wherein the stripline and the reference electrode are defined by the first and second patterned electrically conductive features formed in the layered stack.

13. The transmission line of claim 1, wherein the reference electrode is substantially planar.

14. The transmission line of claim 1, further comprising a second reference electrode, wherein the stripline is located between the reference electrode and the second reference electrode.

15. A transmission line comprising:
a reference electrode; and
a stripline meandering along a meander pattern within a meander plane and having a surface that also meanders in a direction perpendicular to the meander plane, wherein the stripline includes a plurality of rectangular cuboids defining the meander pattern of the stripline, and wherein the plurality of rectangular cuboids includes:
first rectangular cuboids having a first dimension along a direction perpendicular to the plane; and
second rectangular cuboids having a second dimension along the direction perpendicular to the plane, wherein the first dimension is different relative to the second dimension.

16. The transmission line of claim 15, further comprising:
a plurality of metal layers, wherein the plurality of rectangular cuboids includes:
a first set of rectangular cuboids contained within one layer of said plurality of metal layers; and
a second set of rectangular cuboids contained within another layer of said plurality of metal layers.

17. A system comprising:
a first antenna; and
a first termination coupled to the first antenna, wherein the first termination includes a transmission line with a stripline meandering along a meander pattern within a meander plane, wherein the stripline has a surface that also meanders in a direction perpendicular to the meander plane, and the stripline includes a first stripline section that includes a first patterned conductive feature in a form of a first rectangular cuboid within a first metal layer of the layered stack, and a second stripline section that includes a second patterned conductive feature in a form of a second rectangular cuboid within a second metal layer of the layered stack, wherein the first and second rectangular cuboids are directly connected together.

18. The system of claim 17, further comprising:
an array of antennas, wherein the first antenna is included in the array of antennas.

19. The system of claim 17, further comprising:
a reference electrode formed from a patterned feature of a third metal layer of the layered stack.

20. The system of claim 17, wherein the stripline further includes:
a third stripline section that includes a third patterned conductive feature in a form of a third rectangular cuboid within a fourth metal layer of the layered stack, wherein the second and third rectangular cuboids are directly connected together.

* * * * *